United States Patent

Purdy et al.

[15] 3,661,653

[45] May 9, 1972

[54] THERMOELECTRIC APPARATUS

[72] Inventors: David L. Purdy, Indiana; Andrew C. Nyce; Frederick Forscher, both of Pittsburgh, all of Pa.

[73] Assignee: Arco Nuclear

[22] Filed: Mar. 21, 1969

[21] Appl. No.: 809,438

Related U.S. Application Data

[63] Continuation of Ser. No. 557,513, June 14, 1966, abandoned.

[52] U.S. Cl. ............................................136/212, 136/225

[51] Int. Cl. ...................................................H01v 1/02

[58] Field of Search..................136/205, 211, 212, 224, 225

[56] References Cited

UNITED STATES PATENTS

| | | | |
|---|---|---|---|
| 683,098 | 9/1901 | Baecker | 136/225 |
| 2,985,949 | 5/1961 | Rice | 136/225 X |
| 3,019,278 | 1/1962 | Fischer | 136/212 |
| 3,261,720 | 7/1966 | McCormack | 136/205 |

*Primary Examiner*—Allen B. Curtis

[57] ABSTRACT

The thermoelectric tape disclosed is made up of thermoelectric wires as warp and thermally and electrically insulating thread as woof. The woof consists of threads of glass or quartz fibers except at the ends of the warp where cotton, which can be readily stripped, is used. The tape may include two layers, one having thermoelectric positive wires and the other negative wires, with the ends of the wires connected in unlike pairs to form junctions.

6 Claims, 7 Drawing Figures

THERMOELECTRIC APPARATUS

This application is a continuation of application Ser. No. 557,513, filed June 14, 1966 to David L. Purdy et al., and now abandoned.

This invention relates to the thermoelectric art and has particular relationship to thermoelectric piles including a large number of thermoelectric pairs for producing a voltage of moderate or substantial magnitude. Apparatus in accordance with this invention is incorporated in the apparatus disclosed in an application Ser. No. 554,874, filed on June 2, 1966, now abandoned for continuation No. 817,271 filed Apr. 14, 1969, for Electrical Generator to David L. Purdy and assigned to Nuclear Materials And Equipment Corporation and this Purdy application is incorporated herein by reference.

In generators as disclosed in the Purdy application thermal energy is converted into electrical energy by thermopiles composed of a large number of thermocouples. Each couple comprises a pair of wires (or when the couples are connected in series-parallel redundancy pairs of two or more wires). For example, the positive wire of the pair may be copper, iron, Chromel-P alloy, nickel-molybdenum alloys, such as 82 Ni-18 Mo or 79 Ni-20 Mo-1 Mn; Tophel Special alloy, 10 Cr Balance Ni; Tophel alloy, 9.3 Cr Balance Ni; and the negative wire may be Constantan alloy, Platinel-1503 alloy, 35 Pd, 65 Au; Cupron Special alloy, 40 Ni, 59.5 Cu, 0.5 Mn; Cupron alloy 45 Ni, 55 Cu. In the typical practice of the invention disclosed in the Purdy application each couple consists of Tophel Special and Cupron Special alloys.

For a temperature difference of several hundred centigrade degrees between the hot junction and the cold junction, a thermocouple of the type described above is capable of producing of the order of a millivolt potential. To produce a volt it is necessary that a thermopile be formed of 500 to 1,000 couples connected in series. The separate couples must necessarily be insulated from each other. In addition, in apparatus such as that disclosed in the Purdy application the power output of the generator must be very small. Typically a generator such as that disclosed in the Purdy application has a power output of only 162 microwatts. To achieve this low power output without external resistance, it is necessary that the internal impedance of the thermopile be high; that is, the resistance of the thermocouple wires must be high; the wires must be of small diameter. Typically the wires in a generator as disclosed in the Purdy application may have a diameter of between 0.001 and 0.0025 inch.

In producing a Purdy generator it is then necessary to provide a thermoelectric unit of a large number of fine wires effectively insulated from each other and it is an object of this invention to provide such a unit.

Another object of this invention is to provide a thermopile made of a large number of pairs of thermocouple wires effectively insulated from each other.

In accordance with this invention the thermoelectric wires or elements and the insulating material are formed into a tape composed of one or more layers of woven web. In accordance with the broader aspects of this invention either one, the wire or insulating material, may be the warp, and the other, the woof. Specifically, it is preferred that the wires be the warp and the insulating material the woof because the insulating material can be readily bent about the wires and also because as the woof, the insulating material is interwoven with the wires forming separate insulating pockets for each wire (or plurality of wires in a series-parallel redundancy unit).

The tape may be formed of a warp alternately of wires of one polarity and of wires of the opposite polarity. Typically, the warp may consist alternately of two wires or elements of Tophel special alloy and two wires or elements of Cupron special alloy. The tape may also be formed in two layers one layer including a warp of wires of one polarity and the other including a warp of wires of the opposite polarity. For example, one layer of the tape may have a warp of Tophel special alloy throughout and the other layer of the tape may have a warp of Cupron special alloy throughout. In forming the tape the wires of the warp and the woof are subjected to substantial tension; it is essential that the warp wires and the woof fabric be capable of withstanding the tensions. The thickness of the tape is determined by the number of picks per unit length of warp. Alternatively, the wires may be coated with an insulator and the tape formed of a warp of pairs of wires of opposite polarity.

A typical tape made in the practice of this invention includes two layers: a layer whose warp is Tophel special alloy of 0.001 inches diameter and a layer whose warp is Cupron special alloy of 0.0015 inch diameter. In each case the woof is of strands of E-glass insulation, each strand being composed of 200 fibers, each fiber of 0.0002 inch thickness. The thickness may be between 0.002 and 0.005 formed by weaving between 45 and 75 picks per inch of the warp.

For a better understanding of this invention, both as to its organization and as to its method of operation, together with additional objects and advantages thereof, reference is made to the following description, taken in connection with the accompanying drawings, in which.

Figure 5:
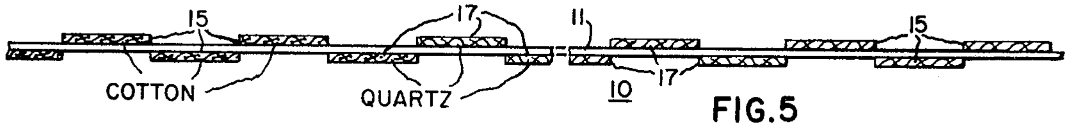
FIG. 5 is a view in section taken along line V—V of FIG. 1 but assumed to extend along the whole width of the tape and for clarity including only the top layer 12.

The tape 10 according to this invention shown in the drawings includes woven layers 12 and 14. Layer 12 has a warp of wires 11 and 13 of positive polarity and layer 14 has a warp of wires of negative polarity. Each layer has a woof of threads 15 and 17 respectively. The threads 15 constitute narrow strips extending near both ends of each layer 12 and 14 (FIG. 5) and typically may be composed of a material such as cotton which may be readily stripped away, for example by burning. The threads 17 are composed of an insulating material, typically quartz or glass fibers. The layers 12 and 14 are isolated by layers 16, 18 and 20 of insulating fabric typically quartz.

Typically the wires 11 and 13 are of a diameter of the order 0.001 to 0.0015 inch and extend in pairs along the length of the tape. The wires 11 may be of different diameter than the wires 13. The wires 11 and 13 may be composed of the above-listed materials or others and typically wires 11 may be of Tophel special alloy and may be 0.001 inch diameter while wires 13 are of Cupron special alloy and are 0.0015 inch diameter. The quartz threads 17 are interlaced with the wires 11 and 13 forming pockets 19 in which the successive pairs of wires 11 and 13 are insulated from each other.

The layers 12 and 14 are woven on a conventional loom. Typically the wires 11 or 13 are pulled from reels under tension forming an array of tensioned wires along the length dimension of a layer. The threads 15 and 17 are pulled from appropriately positioned reels in a direction perpendicularly to the wires 11 and 13 and are interlaced with the wires.

In the use of the tape 10 for producing electrical power the ends of the adjacent wires 11 and 13 are connected together. For this purpose the ends of the pairs of wires 11 and 13 of the layers 12 and 14 respectively are brazed together in grooves 20 of ceramic insulators 21 and 23 as disclosed in the Purdy application.

Both insulators are thermally conducting; one, 21, is connected to a heat source and the connected ends of the wires in its grooves 20 serve as hot junctions and the other, 23, is connected to a heat sink and the connected end of the wires in its grooves serve as cold junctions.

Figure 6:
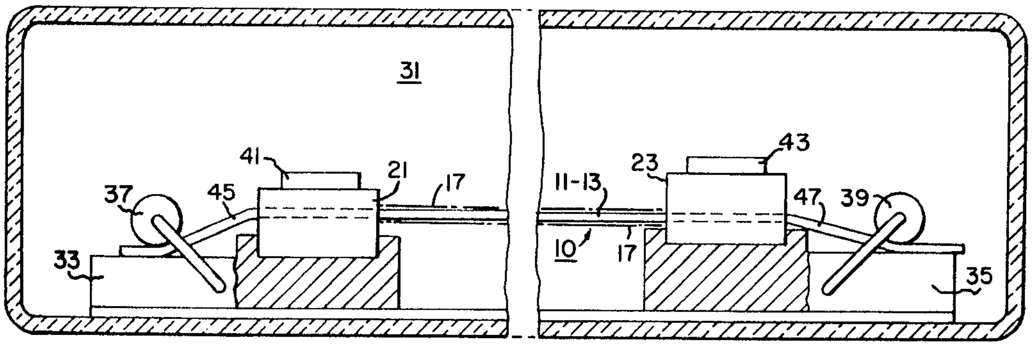
FIG. 6 is a diagrammatic view showing apparatus for connecting the ends of the wires of the tape in a thermopile.

The connection of the ends of the wires 11 and 13 is carried out with the apparatus shown in FIG. 6. This apparatus includes a furnace 31 having a pair of spaced supports 33 and 35 in which the ceramic insulators 21 and 23 are mounted. The cotton threads 15 are removed from both ends of the layers 12 and 14 by burning and the tape 10 is stretched between the insulators 21 and 23 with the wires 11 and 13 from which the cotton has been removed and which have been thoroughly cleaned in the grooves 20 in the insulators. There are four wires, two positive, 11, and two negative, 13, in each groove 20. The wires 11 and 13 are held tightly in the grooves by rollers 37 and 39 pivotal on the supports 33 and 35. There is a copper-silver brazing compound 40 in the grooves. The wires 11 and 13 and the compound in each groove are then heated by resistance heaters 41 and 43 and the brazing of the wires is effected. The ends 45 and 47 of the tape beyond the insulators 21 and 23 are then severed.

Figure 3:
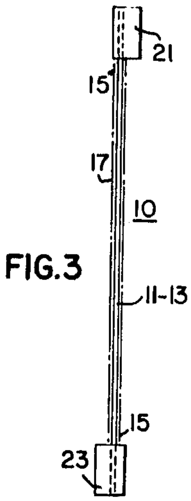
FIG. 3 is a view in edge elevation showing the manner in which the tape is assembled for use in a thermopile.
Figure 1:
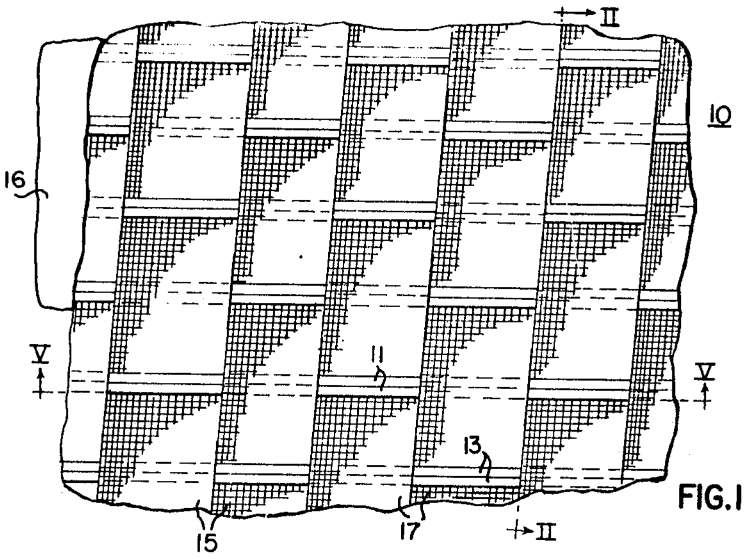
FIG. 1 is a plan view of a portion of thermoelectric tape in accordance with this invention with the top layer of insulation removed.
Figure 4:
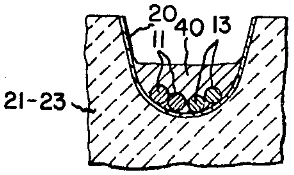
FIG. 4 is a fragmental view in end elevation showing the manner in which the thermoelectric wires of the tape are connected.
Figure 2:
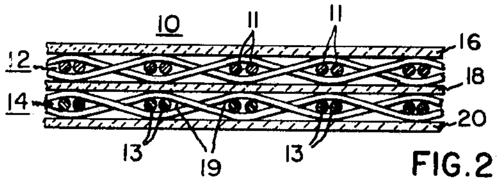
FIG. 2 is a view in section taken along line II—II of FIG. 1.
Figure 7:
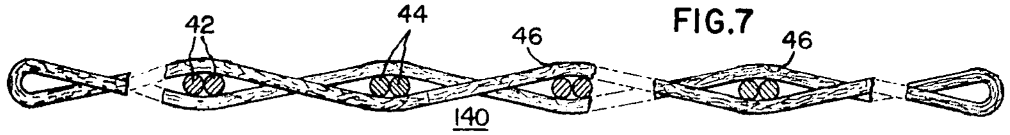
FIG. 7 is a view in section showing a modification of this invention.

In FIG. 7 a tape 140 is shown which consists of one layer and which the warp is formed of alternate positive and negative wire pairs 42 and 44. The woof 46 is an insulating fabric such as quartz.

While a preferred embodiment of this invention has been disclosed herein, many modifications thereof are feasible. This invention then is not to be restricted except insofar as is necessitated by the spirit of the prior art.

We claim as our invention:

1. A tape including at least a pair of contiguous woven layers, each said layer being composed of warp threads and woof threads interlacing each other, one set of said threads of each layer being composed of electrically insulating material, the other set of threads of one layer being composed substantially throughout of positive thermoelectric material, and the other set of threads of the other layer being composed substantially throughout of negative thermoelectric material, the threads of positive material respectively being connected to corresponding respective threads of negative material to form separate thermoelectric junctions.

2. The tape of claim 1 wherein the one set of threads of each layer is composed both of thermally and of electrically insulating material.

3. A thermoelectric unit including a tape composed of sets of warp threads and woof threads, one of said set of threads being composed of electrically insulating material and the other set being composed of thermoelectric wires, including wires both of relative positive and negative thermoelectric polarity, a first insulator having grooves, a second insulator having grooves, means interconnecting in each of the grooves of said first insulator, the ends of at least a pair of said wires, said pair including a wire of positive thermoelectric polarity and a wire of negative thermoelectric polarity, and means for interconnecting, in each of the grooves of said second insulator, the ends opposite to said first-named ends, of at least a pair of said wires, said pair also including a wire of positive thermoelectric polarity and a wire of negative thermoelectric polarity.

4. The unit of claim 3 wherein the wires of positive thermoelectric polarity and the wires of negative thermoelectric polarity are each distributed substantially uniformly throughout the area of the tape.

5. A thermoelectric tape composed of sets of warp threads and woof threads interlacing each other, one set of said threads being composed of thermoelectric material and the other set of threads including first threads of insulating material, the said threads of insulating material extending from positions near one of the ends of said threads of thermoelectric material to positions near the opposite ends of said threads of thermoelectric material, said other set of threads also including second threads of a different material than said insulating material, said second threads of different material extending from the threads of insulating material at said opposite ends of said threads of thermoelectric material to the ends of said threads of thermoelectric material.

6. The tape of claim 5 wherein the first threads are of a destruction resisting material, and the second threads are of a more readily destructible material.

* * * * *